Patented Nov. 6, 1945

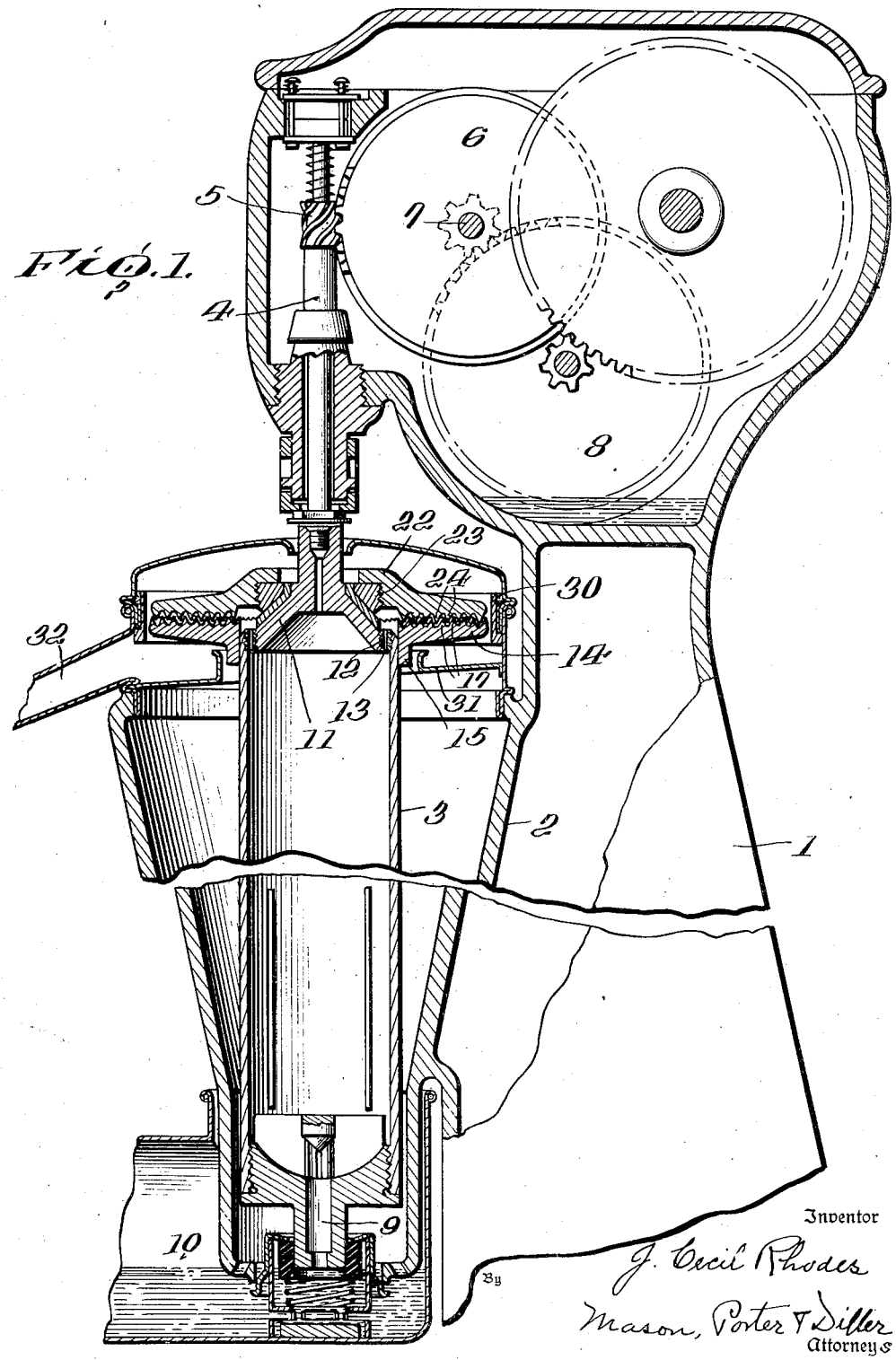

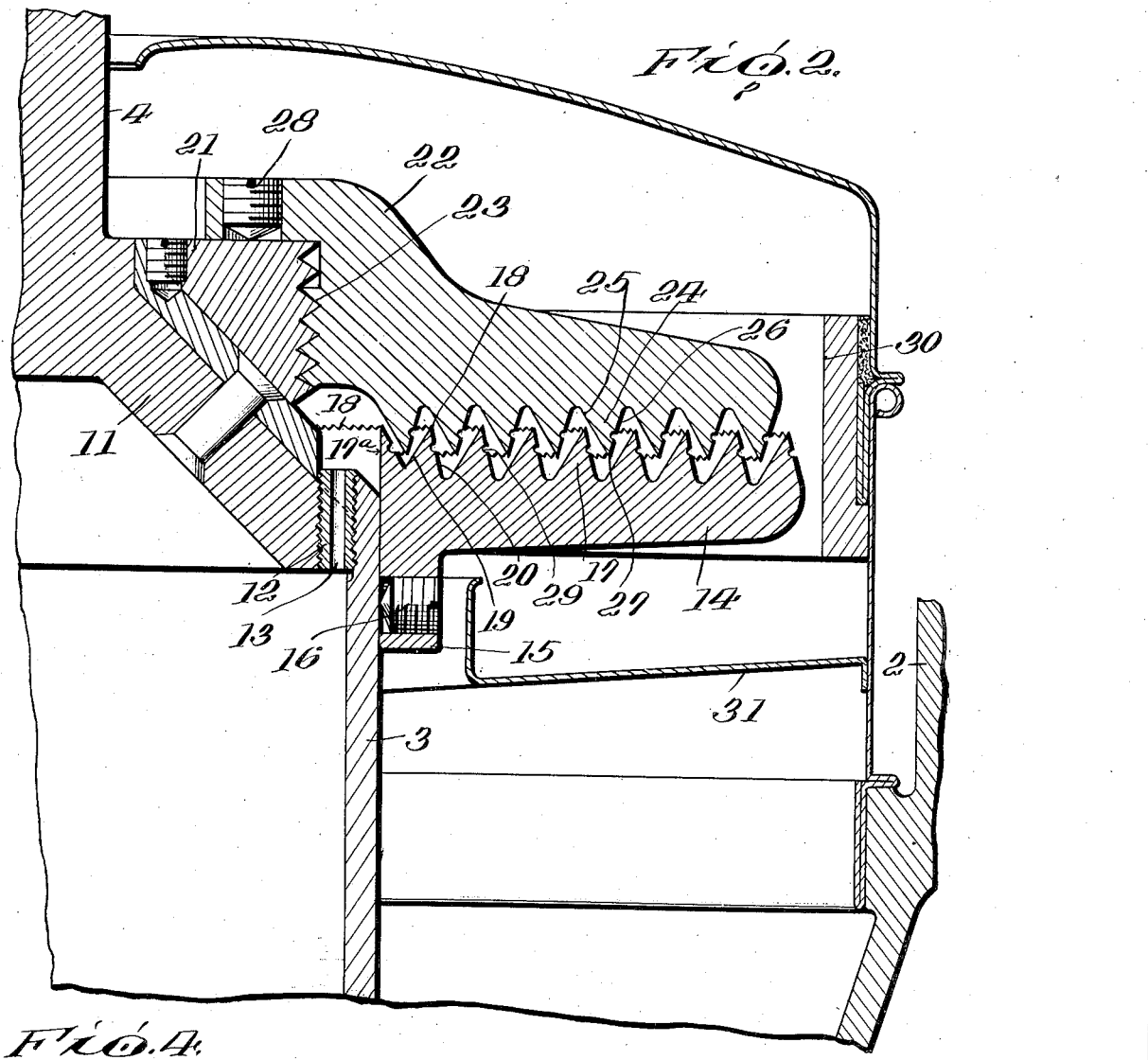
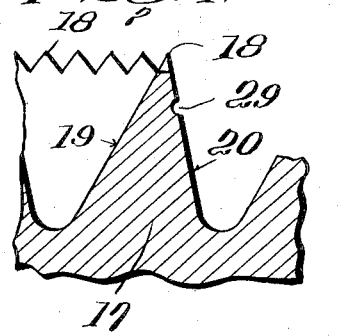
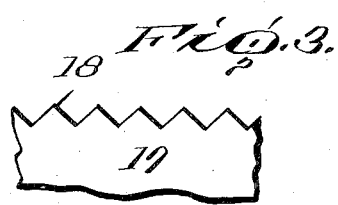

2,388,573

UNITED STATES PATENT OFFICE 2,388,573

APPARATUS FOR HOMOGENIZING MIXED LIQUID INGREDIENTS

John Cecil Rhodes, Jenkintown, Pa., assignor to The United Dairy Equipment Company, West Chester, Pa., a corporation of Pennsylvania Application May 20, 1944, Serial No. 536,632

3 Claims. (Cl. 259—96)

The invention relates to new and useful improvements in an apparatus for homogenizing mixed liquid ingredients containing oily substances.

An object of the invention is to provide an apparatus of the above type wherein the oily globules of the mixed ingredients will be efficiently broken and torn into smaller globules so as to produce a stable homogenized product.

Another object of the invention is to provide an apparatus of the above type wherein the ingredients are moved by centrifugal force over a series of radial spaced concentric blades at the discharge end of a rotary bowl, each of which terminates in a relatively sharp edge operating to rupture the oily globules as they are released therefrom and impacted against the next adjacent blades.

A further object of the invention is to provide an apparatus of the above type wherein the faces of the blades against which the ingredients are impacted are inclined outwardly so that the spray striking a blade will move toward the free end thereof and clear the same for the following globules.

These and other objects will in part be obvious and will in part be hereinafter more fully disclosed.

In the drawings:

Figure 1 is a view in vertical section through a portion of an apparatus having the improvements applied thereto;

Figure 2 is an enlarged vertical sectional view through the upper end of the bowl showing only one side of the bowl and the adjacent casing members; and Figure 3 is a detail showing the section of one of the serrated edges in face view;

Figure 4 is an enlarged sectional view of one of the blades.

Referring to Figure 1 of the drawings, the apparatus includes a supporting frame structure 1. Formed integral with said supporting frame is a bowl casing 2 in which is mounted for rotation a homogenizing bowl 3. This bowl is supported by a spindle 4 mounted in suitable bearings in the frame. The spindle is the sole support of the bowl as the lower end of the bowl is merely guided in a collar carried by the bowl casing 2. The spindle 4 carries a worm gear 5 which meshes with a worm gear 6. The worm gear 6 is fixed to the shaft 7 and the shaft is driven by a suitable motor. The gear 6 rotates a gear 8 which functions to splash oil throughout the gear casing and lubricates the other gears and the bearings for the spindle 4.

The bowl 3 at the lower end is closed except for a receiving opening 9 through which the mixed ingredients to be homogenized pass into the bowl. Associated with the lower end of the bowl is a feed cup 10 which is supplied with the mixed ingredients and the cup is maintained filled with ingredients to a level above the inlet 9 into the bowl. The upper end of the bowl is closed by a head 11 which is secured to the wall of the bowl 2 in any suitable way so as to make a sealed closure for the bowl. A sleeve 12 is threaded into an opening through the head leading into the bowl and this sleeve has a passage 13 therethrough. There are preferably eight or more of these passages for the discharge of the mixed ingredients from the bowl. The number of passages may be increased or decreased, but they should be dimensioned relative to the inlet opening 9 so as to cause a partial vacuum within the bowl and thus suck the ingredients to be homogenized into the bowl through said inlet opening. The ingredients as they enter the inlet opening 9 are thrown laterally into contact with the side walls of the bowl and to then move up the side wall of the bowl to the outlet passages 13. The centrifugal force acting upon the mixed ingredients as they move along the wall of the bowl will cause the foreign particles to cling to the wall while the mix passes over the same and is thus clarified.

All of the parts mentioned above are of the usual construction and further detailed description thereof is not thought necessary.

Attached to the upper end of the bowl 2 and rotating therewith is a disk or plate 14. Said disk has a hub 15 with an opening therethrough which fits the upper end of the bowl. The disk is secured to the bowl by a set screw 16. This disk is provided on its upper face with a series of concentric radially spaced blades 17. These blades extend upwardly and terminate in relatively sharp edges or crests 18. These edges are roughened or serrated as indicated in the drawings. The inner wall 19 of each blade except the first one, 17a, is inclined outwardly toward the edge of the blade and forms an impact receiving surface which is spaced away from the crest of the preceding blade. The angle of this wall is preferably about 15°. The outer wall 20 of each blade, except the blade 17a, is also inclined slightly but is more nearly parallel to the axis of rotation of the bowl.

Secured to the head 11 is a ring member 21.

Said ring member is rigidly fastened to the head in any suitable way. Mounted on this ring member 21 is an upper disk or cap 22. Said disk 22 has a threaded connection 23 with the ring 21. On the under face of this disk or cap member 22 are a series of radially spaced concentric blades 24. These blades are shaped similar to the blades 17, that is, each blade has an inclined inner face 25 and an inclined outer face 26 which meet in a relatively sharp edge 27.

The disk 22 is placed on its support so that the end portions of its blades will overlap the end portions of the blades on the disk 22, in a direction radial of the axis of the rotating bowl. The extent of overlap may be varied by turning the disk 22 on its threaded connection and fastening the disk in a set position by set screws, one of which is indicated at 28. By shifting the disk the distance between the adjacent faces of the blades may be increased or decreased, and thus the dimensioning of the channel through which the ingredients flow can be varied. The ingredients, after they leave the passage 13, are thrown by centrifugal force against the inner wall of the blade 17a and will spread out on said wall and move over the sharp edge thereof from which they are released in the form of a fine spray and impacted by centrifugal force against the adjacent wall of a blade 24. Inasmuch as this wall of the blade is inclined outwardly toward the edge of the blade, the ingredients as they are impacted against the inclined wall will move along the wall so as to clear the same for the ingredients which are to follow. The mixed ingredients will pass from one blade to another and as they move outward, the surfaces against which they are impacted increase in circumferential area and therefore the ingredients will spread out into thin films moving along the blades and a fine spray as they pass from one blade to the next.

The oily globules of the mixed ingredients will be ruptured as they pass over the sharp roughened edge of each blade and are impacted against the next adjacent surface. This will tear or break them into smaller globules and as the rupturing of the globules continues from one blade to the other, the oily products will be reduced to very small or fine globules and thus the product is caused to be thoroughly homogenized and very stable. The roughened edge of the blade accomplishes two functions. First it serves as a means to cause the ingredients passing over the same to travel at the same speed as the blade and second it serves the purpose of increasing the length of the blade edge and thus aids in the spreading out of the film. As noted above, the ingredients flow along the inclined walls of the blades against which they are impacted in a very thin film form and in order that they may be released at the edge so as to be impacted against the opposed wall, each blade is provided with a groove 29 a very short distance from the edge, which prevents the film from creeping around the edge of the blade and along the blade in a flow stream.

As noted above, the number of openings or passages 13 is not essential except that they should be so proportioned relative to the inlet opening to the bowl as to prevent air entering the bowl. It is also important that the channels between the blades shall be dimensioned so as to avoid a flow stream through the channels. This is accomplished by the adjustment of the disk 22 so as to vary the size of the channels and by regulating the flow of the film from the bowl onto the blades. As the ingredients leave the rotating blades, they will be impacted against a surrounding cylindrical wall 30 and will be collected in a pan 31 and discharged through a spout 32 into a suitable means for cooling the same.

The improved homogenizing bowl is particularly adapted for the homogenizing of oily substances and water products such as skim milk powder (dehydrated skim milk), fresh unsalted butter and water, which ingredients, when properly proportioned and thoroughly homogenized, produce a product having all the characteristics of natural whole milk or natural cream.

The same ingredients as above referred to for making a milk product may also be used for making ice cream mix, with the addition of sugar, gelatin, etc. While the invention is particularly adapted for the homogenizing of ingredients to produce a milk product, it is also to be understood that from certain aspects of the invention the homogenizer may be used for homogenizing any oily substance and watery product.

It is obvious that many changes may be made in the details of construction without departing from the spirit of the invention as set forth in the appended claims.

I claim:

1. A homogenizer including in combination a rotary closed bowl receiving and discharging the ingredients in a continuous flow, said bowl having a discharge opening at its upper end, a disk attached to said bowl at the upper end thereof and rotating with the bowl, said disk having on its upper face a series of radial spaced concentric upwardly projecting blades terminating in sharp edges, an upper disk attached to and rotating with said bowl and having on its under face a series of radially spaced downwardly projecting concentric blades, each terminating in a sharp edge, the blades on said upper disk being disposed so as to lie between the blades on the lower disk with the end portions of the blades overlapping in a radial direction, the inner wall of each blade being inclined outwardly towards its edge, and the outer wall of each blade having a groove disposed adjacent the edge for causing the film to be released at the edge, the edge of each blade being roughened so as to facilitate the rupturing of the globules passing over the same.

2. A homogenizer including in combination a rotary closed bowl receiving and discharging mixed ingredients in a continuous flow, said bowl having discharge openings in its upper end, a lower disk carried by said bowl at the upper end thereof and rotating therewith, said disk having on its upper face a series of radially spaced blades concentric to the axis of rotation of said bowl, an upper disk carried by said bowl and rotating therewith and having on its under face a series of radially spaced blades concentric to the axis of said bowl and disposed between the blades on the lower disk with the end portions of the blades of said disks overlapping in a radial direction, said discharge openings being disposed inwardly of said blades whereby the mixed ingredients discharged from the bowl will be caused to pass outwardly between the disks by centrifugal force, each of said blades having a circumferentially continuous impact receiving inner face which inclines outwardly to a free crest, the crest of each blade on each disk being spaced away from the impact receiving face of the next outer blade on the other disk, said discharge openings being of smaller capacity than the channel between the disks whereby the ingredients will be caused to flow in a progressively thinner and broader film outwardly along the inner faces of the blades in succession, spreading out thereon and being released from the free crest thereof and impacted against the impact receiving inner face of the next outer blade.

3. A homogenizer including in combination a rotary closed bowl receiving and discharging mixed ingredients in a continuous flow, said bowl having discharge openings in its upper end, a lower disk carried by said bowl at the upper end thereof and rotating therewith, said disk having on its upper face a series of radially spaced blades concentric to the axis of rotation of said bowl, an upper disk carried by said bowl and rotating therewith and having on its under face a series of radially spaced blades concentric to the axis of said bowl and disposed between the blades on the lower disk with the end portions of the blades of said disks overlapping in a radial direction, said discharge openings being disposed inwardly of said blades whereby the mixed ingredients discharged from the bowl will be caused to pass outwardly between the disks by centrifugal force, each of said blades having a circumferentially continuous impact receiving inner face which inclines outwardly and forms with the outer face of the blade a sharp crest, the crest of each blade on each disk being spaced away from the impact receiving face of the next outer blade on the other disk, said discharge opening being of smaller capacity than the channel between the disks whereby the ingredients will be caused to flow in a progressively thinner and broader film outwardly along the inner faces of the blades in succession, spreading out thereon and being released from the sharp crest thereof and impacted against the impact receiving inner face of the next outer blade.

J. CECIL RHODES.